United States Patent

[11] 3,625,264

[72] Inventor Leonard W. Swain
 London, Ontario, Canada
[21] Appl. No. 78,789
[22] Filed Oct. 7, 1970
[45] Patented Dec. 7, 1971
[73] Assignee Emco Limited
 London, Ontario, Canada
[32] Priority Feb. 20, 1970
[33] Canada
[31] 075,381

[54] ANTISTATIC VALVE
 12 Claims, 5 Drawing Figs.

[52] U.S. Cl. ................................... 141/198,
 137/413
[51] Int. Cl. .................................... B65b 39/00
[50] Field of Search .......................... 137/386,
 389, 390, 393, 409, 413, 414, 428, 429, 430, 433,
 434; 141/198; 251/117, 118, 120

[56] References Cited
 UNITED STATES PATENTS
2,659,384  11/1953  Lowe ........................... 251/117 X
2,796,090  6/1957   Carriol ......................... 141/198
3,138,170  6/1964   Schaetzly ..................... 137/386

Primary Examiner—M. Cary Nelson
Assistant Examiner—David R. Matthews
Attorney—Fetherstonhaugh & Co.

ABSTRACT: A flow control valve for reducing the buildup of static electricity in a liquid when loading a liquid into a storage tank. The valve is actuated by a float which senses the level of liquid in the storage tank and moves the valve between a position wherein the flow through the valve is restricted to an open position wherein the flow through the valve is substantially unrestricted. The float is adapted to activate an expandable diaphragm valve when the level of liquid in the tank rises above the level of the upper end of the discharge orifice which opens into the tank. The expandable diaphragm valve moves the many valve closure members between the open and closed positions as required in use such that the flow of liquid into the tank is quite slow until the discharge orifice is covered and thereafter the valve opens rapidly to permit full flow into the tank.

PATENTED DEC 7 1971 3,625,264

INVENTOR.
LEONARD W. SWAIN

BY *Featherstonhaugh & Co.*

ATTORNEYS

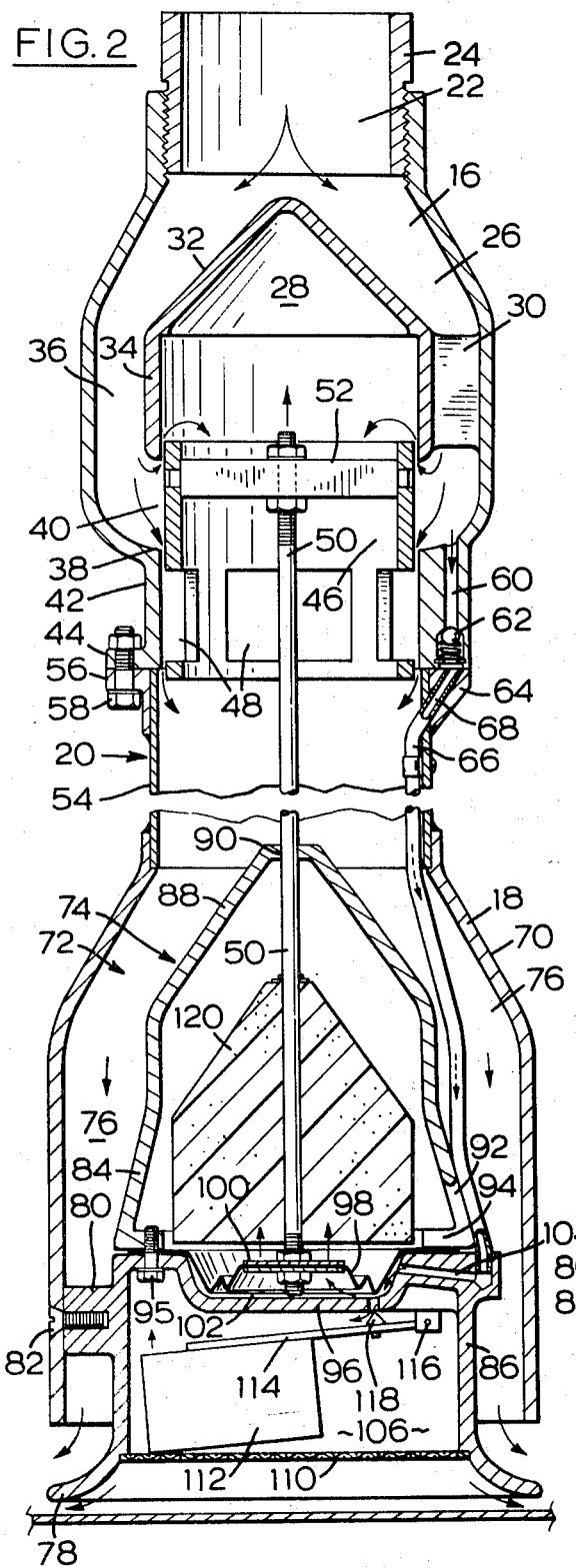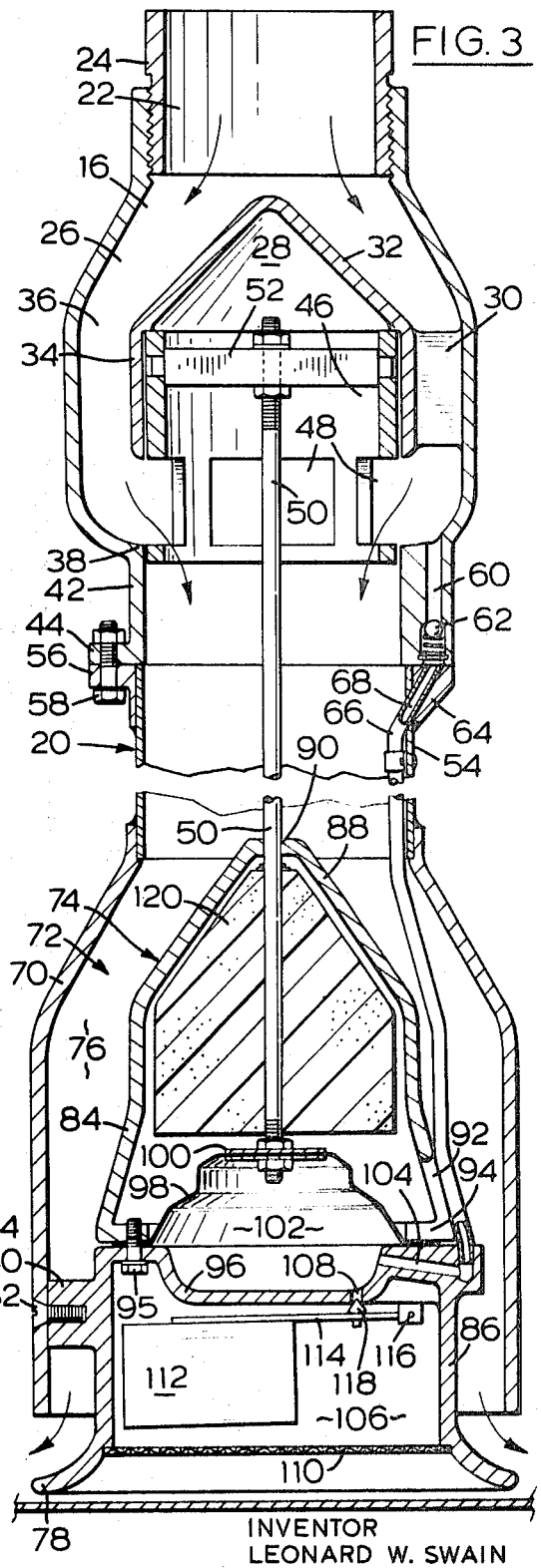

ANTISTATIC VALVE

This invention relates to values for controlling liquid flow. In particular, this invention relates to an antistatic liquid flow control device for controlling the flow of a liquid into a storage tank or the like.

In the handling of liquid fuels such as gasoline, kerosene and the like, it is well known that care must be taken to prevent explosions. This is particularly true when transferring the fuel from one container to another. It has been found that if a liquid fuel is loaded into a storage tank at high speed through a filling tube, a static charge will build up in the fuel as a result of the turbulence caused at the discharge orifice. The charge will continue to build up until the end of the nozzle is submerged in the liquid rising within the storage tank. If this charge becomes excessive, there is a danger of explosion resulting from the shorting of the charged particles.

The present invention provides a flow control device for controlling the flow of liquid into a storage tank to reduce the buildup of a static charge in the incoming liquid.

A flow control device according to an embodiment of the present invention comprises a housing having input passage means communicating with a source of liquid. The housing also has a primary through passage means and a primary discharge orifice opening from the housing and communicating with the through passage. A valve port communicates between the input passage and the through passage. A valve closure member is mounted in the housing for movement between a first position wherein it substantially closes the valve port and a second position wherein the valve port is open. The valve closure means is moved by actuator means operable in response to the level of liquid in a storage tank to move the valve to-and-fro between the open and closed positions such that prior to the level of liquid in the storage tank reaching a predetermined level, the flow of liquid into the tank will be considerably restricted while after the level of liquid in the tank reaches the predetermined level, the valve port will be opened to allow rapid filling of the liquid storage tank.

The invention will be more clearly understood after reference to the following detailed specification read in conjunction with the drawings, wherein, FIG. 1 is a diagrammatic illustration of a filling tube operably located within a liquid storage tank;

FIG. 2 is a longitudinal cross section of a flow control device of FIG. 1 in the first operational position;

FIG. 3 is a cross-sectional view similar to FIG. 2 showing a second operational position;

Figure 1:
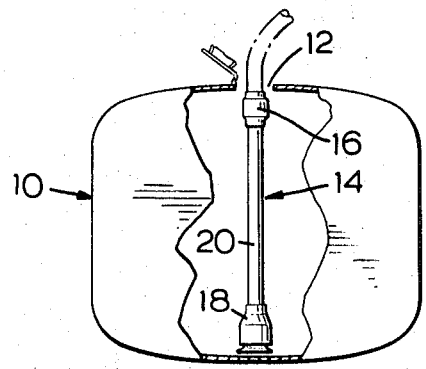

With reference to FIG. 1 of the drawings, the reference numeral 10 refers generally to a liquid storage tank of a well-known type such as an underground gasoline storage tank, a bulk tank truck storage tank, or a ship fuel storage tank. The tank 10 has an opening 12 formed in its upper wall which is of sufficient diameter to receive the improved flow control device generally indicated by the reference numeral 14. In the embodiment of the invention illustrated in FIGS. 1, 2 and 3 of the drawings, the improved flow control device 14 consists of an upper housing 16, a lower housing 18, and a connecting tube 20. The connecting tube 20 is preferably of a sufficient length to locate the upper housing 16 adjacent the upper wall of the tank 10 when the lower housing 18 is adjacent the lower or bottom wall of the tank. In all installations it is desirable to ensure that the bottom housing 18 is located adjacent the lower wall of the tank so as to discharge liquid directly onto the bottom wall and thereby create a minimum turbulence. As will be seen hereinafter, the cutoff valve for controlling the flow through the filling tube is located in the housing 16 and consequently it is desirable to locate this valve adjacent the upper wall of the tank so that the filling tube will not be left full of fuel when it is withdrawn from the storage tank.

In FIG. 2 of the drawings, the upper housing 16 and lower housing 18 are shown in section. The upper housing 16 has an input passage 22 which threadably receives a tube 24. The tube 24 is connected to the source from which the liquid is being pumped onto the storage tank. The housing 16 has an inner chamber 26. A core 28 is mounted within the chamber 26 and it is spaced from the sidewalls of the chamber 26 by support lugs 30. The core 28 has a cone-shaped upper end 32 which has an apex located in axial alignment with the centerline of the input passage 22. The core 28 also provides a longitudinally extending lip 34 which is spaced from the inner sidewall of the chamber 26 to form a primary through passageway 36. The lower edge of the lip 34 is spaced from the lower edge 38 of the inner sidewall of the housing to form a valve port 40. The housing 26 has a downwardly projecting extension 42 formed within a mounting flange 44 at the lower end thereof. The valve closure member 46 is mounted to reciprocate within the housing 26 and to fit in a prefitting sliding relationship within the lip 34. The upper end of the cylindrical-shaped valve portion 46 is adapted to substantially restrict the flow of liquid through the transfer port 40 when in the position shown in FIG. 2. A plurality of openings 48 are formed in the lower end of the valve member to permit the required maximum flow of liquid through the valve when located in the position shown in FIG. 3 of the drawings. The valve 46 is secured to the upper end of a connecting rod 50 by means of any suitable crossbar 52. The crossbar 52 does not close the upper end of the valve piston, with the result that liquid may flow downwardly through the open upper end of the valve piston. A tubular member 54 is secured to the housing 16 by a flange 56 which is bolted in a conventional manner to the flange 44 by bolts 58. A secondary fluid passage 60 is formed in portion of the sidewall of the upper housing 26 and has a one-way valve 62 mounted in it. The valve 62 consists of a spring-loaded ball which is retained in the opening provided by means of a spring clip. The valve 62 permits liquid to flow out of the valve chamber 26 by way of a secondary passage 60 while preventing the flow of liquid in a reverse direction. A small lug 64 is secured to the tube 54 in a position underlying the bottom end of the secondary passage. The small tubular conduit 66 extends through the lug 64 and the wall of the tube 54 to locate the open upper end thereof in alignment with the open lower end of the second passage 60. The conduit 66 has an inner passage 68 which forms an extension of the secondary passage 60.

The lower housing member 18 consists of a housing 70 having a valve chamber 72 formed therein. The housing 70 is connected at its upper end to the lower end of the filling tube 54. The valve housing generally indicated by the reference numeral 74 is located within a chamber 72 in a spaced relationship with respect to the sidewalls of the chamber 72 so as to form a primary through passage 76 similar to the through passage 36 formed in the upper housing 16. A curved deflector flange 78 is formed at the lower end of the valve housing 74 in a spaced relationship with respect to the lower end of the main housing 70 to form a discharge orifice therebetween which is adapted to direct the flow of incoming liquid laterally of the tank. The valve housing 74 is secured in axial alignment within the chamber 72 by means of support blocks 80 which are located at circumferentially spaced intervals about the valve housing and secured by setscrews 82 to the main housing 70. The valve housing 74 consists of an actuator housing 84 and a lower float-housing member 86. The actuator housing 84 has a conically shaped upper end portion 88 which has a passage 90 formed therein to slidably receive the connecting rod 50. The conically shaped upper portion 88 serves to deflect the incoming flow of liquid into the through passage 76. The housing 84 has one or more flood or drain passages 92 opening into the lower end thereof. A circumferentially extending flange 94 is formed at the lower end of the housing 84 and projects radially inwardly therefrom. The float housing 86 has an upper wall 96 onto which the flange 94 is clamped by means of setscrews 95. A flexible diaphragm 98 is clamped at its peripheral edge between the flange 94 and the upper wall 96. The connecting rod 50 is secured to the flexible diaphragm 98 by a pair of clamping plates 100 which are mounted on the connecting rod 50 by means of conventional locknuts. An expansion chamber 102 is formed between the diaphragm 98 and the upper wall 96 of the float chamber. A passageway 104 is formed in the float housing 86 and is connected at one end to the lower end of the conduit 66 and opens at the other end into the expansion chamber 102. The passageway 104 forms an extension of the secondary passages 60 and 68 such that liquid entering the upper housing 16 may pass through the secondary passage into the expansion chamber 102. A float chamber 106 is formed within the float housing 86 and a vent passageway 108 extends through the upper wall 96 to communicate between the expansion chamber 102 and the float chamber 106. The proportions of the vent passageway 108 are such that when it is fully open, it is capable of venting liquid from the expansion chamber at a greater rate than the rate at which the secondary passageway 104 is capable of filling the expansion chamber so that the expansion chamber will not expand when the vent passageway 108 is open. The screen 110 extends across the lower end of the float chamber to permit liquid to pass in and out of the flow chamber while preventing particles of dirt or the like from entering the flow chamber. A float 112 is mounted at one end of a lever 114 which is pivotally connected at its other end by pivot pin 116 to the housing 86. The float may be made from a unicellular rubber, a closed cell plastic material, cork, metal or the like according to the type of liquid with which the device is to be used. A vent closure member 118 in the form of a small cone-shaped plug is carried by the support arm 114 between the float 112 and the pivot 116. The vent passage closure plug 118 is adapted to move into and out of closing engagement with the vent passage as the float 112 rises and falls within the float chamber.

A secondary float 120 is secured to the connecting rod 50 adjacent the diaphragm 90. The secondary float 120 is movable within the actuator housing 84 and serves to retain the valve closure member 46 in the open position when the actuator housing is flooded with liquid entering by way of passage 92.

The method of operation of the flow control device described above will be clearly understood with reference to FIGS. 1, 2 and 3 of the drawings. The filling tube is located within the storage tank as previously described with the lower housing 18 located at adjacent the bottom wall of the tank and the upper housing 16 located adjacent the upper wall of the storage tank. When the apparatus is not in use, the weight of the valve assembly will cause the diaphragm to collapse to the position shown in FIG. 2. In this position, the valve 46 substantially closes the valve port 40 in the upper housing. When the flow of liquid enters the upper housing, it is substantially restricted by the valve closure member 46. Preferably, however, the valve closure member 46 does not completely stop the flow of liquid as it is desirable to permit limited leakage at the valve. This leakage is diagrammatically illustrated by a number of small arrows in FIG. 2. Liquid will also flow through the secondary passage means 60, 68, and 104 into the expansion chamber 102. Due to the fact that the storage tank is empty, the float 112 will be in the lowered position and the vent passage 108 will be open. Liquid entering the expansion chamber 102 will vent through the vent passage 108 into the float chamber and through the screen 110 into the storage tank. The combined flow of liquid by way of leakage past the valve 46 and venting of the expansion chamber 102 is sufficient to provide for a slow filling of the storage tank. The rate of filling is such that a minimal static charge is built up in the liquid. This gradual filling of the storage tank will continue until the level of liquid in the storage tank raises float 112 to the point where the plug 118 begins to close the vent passage 108. When the rate of discharge of liquid from the vent passage 108 is less than the rage at which liquid is entering the expansion chamber 102, the diagram 98 will be raised. As the diaphragm 98 rises, the valve 46 will also rise and this will continue as the level of liquid in the tank continues to rise until the port 40 begins to open. When the port 40 beings to open, the increased flow of liquid into the storage tank will accelerate the rate at which the float rises and this in turn causes rapid expansion of the expansion chamber 102. Preferably, the float 112 is mounted to effectively reduce the flow through the passage 108 when the level of liquid in the storage tank substantially covers the discharge orifice of the lower housing.

FIG. 3 of the drawings shows the relative positions of the valve member 46, diaphragm 98 and float 112 when the level of liquid is above the predetermined level and the port 40 fully open. When the storage tank has been filled to the required level and the flow into the vent tube is cut off, the level of liquid in the filling tube will come to a level substantially equal o the level of the liquid in the storage tank In this condition, secondary float 120 will serve to retain the valve 46 in the open position to enable the filling tube to be fully drained when it is withdrawn from the storage tank.

Figures 4, 5:
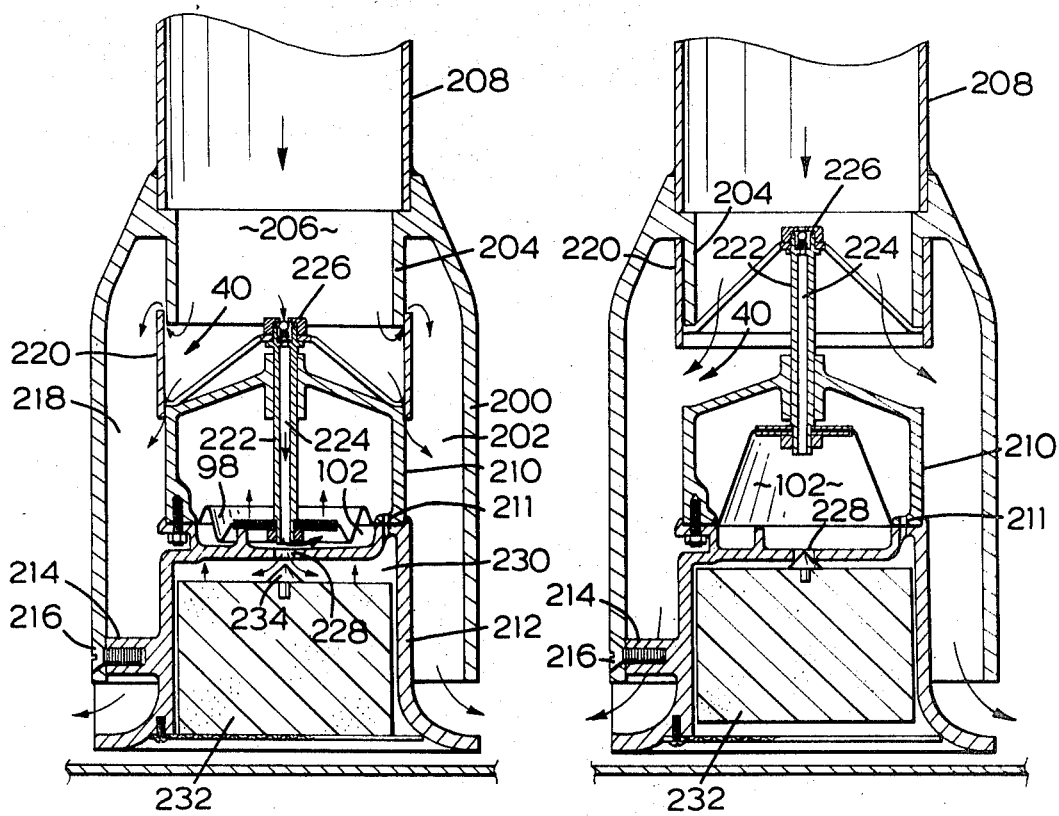
FIG. 4 is a cross-sectional view of a flow control according to a further embodiment of this invention.
FIG. 5 is a cross-sectional view similar to FIG. 4 showing a flow control device in a second operational position.

A further embodiment of this invention is illustrated in FIGS. 4 nd 5 of the drawings. This structure differs from that shown in FIGS. 1 and 2 in that the closure valve, actuator means and float chamber are all mounted within a single housing 200. Housing 200 has a chamber 202 formed therein. A lip 204 projects downwardly into the chamber 202 at the upper end of the housing. An input passageway 206 is formed in the upper end of the housing and extends through the lip portion 204 to the open into the chamber 202. A filling tube 208 is connected to the upper end of the housing 200 to convey liquid to the input passage 206. The valve actuator housing 210 is substantially the same construction as the actuator housing 84 previously described with reference to FIG. 2, and includes at least one vent passage 211. The float housing 212 is secured to the lower end of the actuator housing 210 and the float housing 212 is secured to the main housing 200 by spacer lugs 214 and mounting screws 216 in a manner previously described with reference to FIG. 2. Again, the diaphragm 98 is clamped between the actuator housing 210 and the float housing 212 to form expansion chamber 102 therebetween. In this embodiment, the transfer port 40 is formed between the lower edge of the lip 204 and the upper edge of the actuator housing 210. A sleeve valve closure member 220 is adapted to fit over the lip 204 in a free-fitting sliding relationship and over the upper edge of the actuator housing 210 in a similar free-fitting relationship to substantially restrict the flow of liquid through the port 40 when in the closed position shown in FIG. 4. The sleeve valve 220 is connected to diaphragm 98 by shaft 222. A secondary passageway 224 extends through the shaft 222 to communicate between the expansion chamber 102 and the input passage 206. A small check valve 226 is mounted in the upper end of the shaft 222 to permit one-way flow of liquid into the expansion chamber 102. A vent passage 228 extends through the upper wall of the float housing 212 to communicate between the expansion chamber 102 and the float chamber 230. A float 232 fits freely within the float chamber 230 and is free to rise and fall within the float chamber depending upon the level of liquid in the float chamber. A vent passage closure cone 234 is mounted on the upper end of the float 232 and adapted to move into and out of closing engagement with the vent passage 228.

When the filling tube to which the flow control is attached is located within a storage tank, it is moved to a position adjacent to the bottom of the storage tank. If the storage tank is empty, the flow control device will be located in the closed configuration shown in FIG. 4. When the flow of liquid from the filling tube commences, the rate of flow will be substantially restricted by the sleeve valve 202 so that the tank will fill gradually. When the level of liquid in the tank rises to the point where the float 232 begins to close the vent passage 228, the flow of liquid through the secondary passage 224 will be directed into the expansion chamber 102 and the valve 220 will begin to move towards the open positions shown in FIG. 5.

The atmosphere within the actuator housing is vented by way of passage 211 as the diaphragm 98 expands. The rate at which the valve 220 opens will increase as the leakage past the valve increases and the level in the tank will begin to rise more rapidly. The characteristics of the float 232 are designed to ensure that the discharge orifice at the lower end of the housing 200 is disposed below the level of the liquid in the storage tank before the valve is fully open.

From the foregoing description of the two embodiments illustrated in the drawings, it will be seen that the flow control devices according to the present invention provide an initial flow rate of filling until such time as the level of liquid in the tank is sufficient to permit full-speed filling of the tank. These control devices are adapted to effect a rapid transfer from the flow filling speed to the high filling speed when the conditions are suitable for high-speed filling.

The embodiments of the invention in which an exclusive property or privilege is claimed are defined as follows:

1. A flow control device for controlling the flow of liquid flowing through a filling tube into a liquid storage tank or the like comprising:
   a. housing means,
   b. input passage means formed in said housing,
   c. primary through passage means formed in said housing,
   d. a primary discharge orifice opening outwardly from said housing and communicating with said through passage means,
   e. valve port means communicating between said input passage means and said discharge passage means,
   f. valve closure means mounted in said housing means for movement between a first position wherein the valve port means is substantially closed to restrict the flow of liquid therethrough and a second position wherein the valve port means is open to permit the maximum required flow of liquid therethrough, and
   g. actuator means operable in response to the level of liquid in a storage tank to move said valve closure means to said first position when the liquid level in the tank is below a predetermined level and to rapidly move said valve closure means to said second position when the level of liquid in a tank is above a predetermined level.

2. A flow control device as claimed in claim 1 wherein said actuator means includes,
   a. expandable support means for said valve closure means,
   b. said support means having an expansion chamber formed therein,
   c. said expansion support means being movable from a first restricted position wherein said valve closure means is located in said first closure position and a second expanded position wherein said valve means is located in said second open position in response to expansion and contraction of said expansion chamber,
   d. secondary passage means communicating between said input passage means and said expansion chamber for directing a portion of the liquid entering said housing into said expansion chamber,
   e. vent passage means for discharging liquid from said expansion chamber into a tank, said vent passage means being adapted to discharge liquid from said expansion chamber at a greater rate then said second passage means is adapted to fill said expansion chamber whereby said expansion chamber is normally contracted when said vent passage is fully opened, and
   f. vent passage closure means for closing said vent passage when the level of liquid in a tank is above a predetermined level to thereby cause said expansion chamber to expand under the influence of liquid entering said expansion chamber by way of said secondary passage means to move said valve closure means from said first position to said second position.

3. A flow control device as claimed in claim 2, including one-way valve means in said secondary passage means to permit the flow of liquid from said input passage means to said actuator means while preventing flow means from said actuator means to said input passage means.

4. A flow control device as claimed in claim 1 wherein said actuator means includes,
   a. a diaphragm housing having a flexible diaphragm mounted therein and forming an expandable diaphragm chamber within said housing,
   b. a float housing having a float chamber formed therein and opening outwardly therefrom to be open to a tank in use,
   c. valve support means connecting said valve closure means to said flexible diaphragm,
   d. secondary passage means communicating between said input passage means and said expandable diaphragm chamber,
   e. vent passage means communicating between said expandable diaphragm chamber and said float chamber,
   f. float means mounted in said float chamber for movement therein in response to variations in the level of liquid in a tank, and
   g. vent passage closure means carried by said float means for movement into closing engagement with said vent passage when the level of liquid in a tank is above a predetermined level to thereby cause said diaphragm chamber to expand under the influence of liquid entering said diaphragm chamber by way of said secondary passage means to move said closure valve means from said first position to said second position.

5. A flow control device as claimed in claim 3 wherein said discharge orifice has an upper and a lower edge, said float means being adapted to raise said vent passage closure means to close said vent passage when the level of liquid in a tank rises above the level of said upper edge of said discharge orifice.

6. A flow control device as claimed in claim 1 wherein said discharge orifice has an upper edge and a lower edge, said actuator means being adapted to move said valve closure means to said open position when the level of liquid in a tank rises above the level of the upper edge of said discharge orifice.

7. A flow control device as claimed in claim 1, including secondary float means for maintaining said valve closure means in said second open position after the flow of liquid through said flow control device is stopped, said secondary float means permitting substantially complete drainage of a filling tube when it is withdrawn from a tank in use.

8. A flow control device as claimed in claim 1 wherein said housing means comprises a single housing adapted to be secured to the lower end of a filling tube to be disposed adjacent the bottom wall of a storage tank in use.

9. A flow control device as claimed in claim 1 wherein said housing means comprises a lower housing member and an upper housing member connected to one another by a coupling tube, said lower housing being adapted to be disposed adjacent the bottom wall of a storage tank in use while said upper housing is disposed adjacent to the upper end of a storage tank in use, said lower housing enclosing said actuator means and said upper housing enclosing said valve closure means, connecting rod means extending between said upper and lower housings to operably connect said valve closure means and said actuator means.

10. A flow control means for controlling the flow of liquid passing through a filling tube into a liquid storage tank or the like, comprising,
   a. a main housing,
   b. a valve chamber formed in said main housing,
   c. input passage means opening into the upper end of said main housing and a discharge opening at the lower end of said main housing,
   d. a cylindrically shaped lip projecting into said chamber,
   e. a valve-supporting housing mounted within said chamber,
   f. said valve-supporting housing being spaced inwardly from said housing to provide a primary through passage for liquid, g. said valve housing having a lower end spaced downwardly from said lower end of said main housing to define a discharge orifice therebetween, h. said valve being spaced from said lip means and defining a transfer port communicating between said input passage and said primary through passage, i. valve closure means including a sleeve adapted to slidably engage said lip means, j. support means mounted in said valve housing for supporting said valve sleeve, k. expandable diaphragm means within said valve housing, l. said support means being movable by said expandable diaphragm means from a first position wherein said sleeve valve means substantially closes said transfer port and a second position wherein said transfer port is open, m. said expandable diaphragm valve means including an expansion chamber, n. secondary passage means communicating between said input passage means and said expansion chamber for conveying liquid into said expansion chamber, o. check valve means in said secondary passage for preventing liquid flow from said expansion chamber to said input passage, p. a float chamber formed in said valve housing, q. vent passage means communicating between said expansion chamber and said float chamber, r. float means mounted in said float chamber, s. vent passage closure means carried by said float means, and t. said float means being adapted to rise within said float chamber as the liquid level within a tank rises to close said vent port when the level of liquid rises to a level which submerges said discharge opening of said main housing and thereby cause said expansion chamber to fill with liquid passing through said secondary passage means to move said valve closure sleeve to said open position to permit rapid filling of said tank.

11. A filling tube for filling a liquid storage tank or the like comprising, a. a tubular member of sufficient length to extend into a liquid storage tank to dispose the discharge end thereof adjacent the bottom wall of a tank, b. flow control means having an input passage means for receiving the flow of liquid through said tubular member, c. primary flow passage means formed in said flow control means for permitting a restricted flow of liquid therethrough, d. secondary flow passage means formed in said flow control means for permitting a restricted flow of liquid therethrough, e. valve closure means mounted for movement within said flow control means between a first position wherein a flow of liquid through said flow control means is limited to said secondary flow passage means and a second position wherein the flow of liquid through said control means includes flow through said secondary passage means, and f. valve actuator means for moving said valve closure means to said first position when the level of liquid in the storage tank is below a predetermined level and to said second position when the level of liquid in said storage tank is above a predetermined level.

12. In a filling tube for loading liquid into a storage tank or the like, the tube being adapted to extend downwardly into a tank to locate the discharge end thereof adjacent the bottom wall of a tank, the improvement of flow control means for controlling the liquid flow through said tube, said flow control means comprising primary flow passage means for permitting the required maximum flow through said flow control means into said tank, secondary flow passage means for permitting a restricted flow of liquid through said flow control means in said tank, valve closure means mounted for movement between a first position wherein the flow through said flow control means is limited to flow through said secondary flow passage means and a second position wherein the liquid may pass through said primary flow passage means to permit the maximum required flow, actuator means operable to move said valve closure means to said first position when the level of liquid in the tank is below a predetermined level such that the liquid may only enter the tank by way of the secondary flow passage means, said valve actuator means also being operable to move said valve closure means to said second position when the level of liquid in the tank is above a predetermined level such that liquid may pass through said flow control means by way of said primary flow passage means when the level in the tank is above a predetermined level.

* * * * *